United States Patent [19]

Beardsley et al.

[11] Patent Number: 5,471,631
[45] Date of Patent: Nov. 28, 1995

[54] USING TIME STAMPS TO CORRELATE DATA PROCESSING EVENT TIMES IN CONNECTED DATA PROCESSING UNITS

[75] Inventors: Brent C. Beardsley; Allen C. Brailey; Peter L. H. Leung, all of Tucson, Ariz.

[73] Assignee: International Business Machines Corporation, Armonk, N.Y.

[21] Appl. No.: 963,347

[22] Filed: Oct. 19, 1992

[51] Int. Cl.$^6$ ..................................................... G06F 11/34
[52] U.S. Cl. ........................ 395/650; 364/569; 395/441; 395/182.18; 395/182.1; 395/185.08
[58] Field of Search ................... 371/16.5, 16.1, 371/15.1, 29.1, 61, 62, 48; 395/575, 550; 364/569

[56] References Cited

U.S. PATENT DOCUMENTS

| | | | |
|---|---|---|---|
| 3,967,250 | 6/1976 | Senda | 340/172.5 |
| 4,040,034 | 8/1977 | Belady et al. | 364/200 |
| 4,117,459 | 9/1978 | Douglas et al. | 340/149 |
| 4,287,562 | 9/1981 | Darden et al. | 364/200 |
| 4,710,926 | 12/1987 | Brown et al. | 371/9 |
| 4,816,989 | 3/1989 | Finn et al. | 364/200 |
| 4,914,657 | 4/1990 | Walker et al. | 371/11.3 |
| 4,922,491 | 5/1990 | Gaile | 371/16.1 |
| 5,016,249 | 5/1991 | Hurst et al. | 371/16.1 |
| 5,090,014 | 2/1992 | Polich et al. | 371/15.1 |
| 5,195,025 | 3/1993 | Boecker | 364/145 |
| 5,263,152 | 11/1993 | Smith et al. | 395/575 |

FOREIGN PATENT DOCUMENTS

316228  5/1989  European Pat. Off..

Primary Examiner—Robert W. Beausoliel, Jr.
Assistant Examiner—Phung M. Chung
Attorney, Agent, or Firm—H. F. Somermeyer

[57] ABSTRACT

A host processor(s) is loosely-coupled by a plurality of data channels to a peripheral subsystem(s). The host processor(s) has a time of day clock. The peripheral subsystem(s) has a cluster(s) that performs peripheral controller functions. Each cluster has first and second clocks that respectively generate a log entry (logging) reference time and a subsystem time. The first and second clock times result in subsystem time stamps in a log that are not related to the time of day clock. For time correlating the time of day clock with the first and second clocks, a host time stamp is generated from the time of day clock. The host time stamp is sent to the subsystem via one of the data channels for entry into the log with the current time stamps of the first and second clocks as a time-correlating entry. Queue delays in the host processor accessing a data channel for sending the host time stamp and in the subsystem for recording the time-correlating entry are compensated for by updating the host time stamp and by generating an entered time stamp at the time of recording the time-correlating entry. Time stamp correlating operations by a host processor enable recovery from a lost host time stamp.

46 Claims, 4 Drawing Sheets

USING TIME STAMPS TO CORRELATE DATA PROCESSING EVENT TIMES IN CONNECTED DATA PROCESSING UNITS

DOCUMENT INCORPORATED BY REFERENCE

Videki II U.S. Pat. No. 4,574,346 is incorporated by reference for its teachings of path groups and path group ID's (PGID's) in data processing systems.

FIELD OF THE INVENTION

The present invention relates to data processing systems (also termed installations and environments) having a plurality of connected programmed units, more particularly to establishing and exchanging a plurality of time stamps respectively indicating operation times in diverse units.

BACKGROUND OF THE INVENTION

Multi-unit data processing systems usually include connections between diverse programmed units that "loosely couple" the units together. Such loose coupling is exemplified by a plurality of host processors sharing access to a peripheral subsystem via data channels (channel to channel adapters in each of the host processors and peripheral subsystems and the like) for passing data and control information. Such "loose coupling" is contrasted with the plurality of host processors sharing access to a common main memory and are controlled by a same control program. The present invention is most advantageously employed with loosely coupled systems. Such loosely coupled systems each may operated at a different data rate, execute programs at different rates, keep separate diverse logs and the like. As set forth below, several problems can arise relating to such loosely coupled systems that are solved by the present invention.

Several problems are solved by this invention in such multi-unit data processing systems and installations. A first advantageous employment of this invention relates to problem determination (solving and recovering from error conditions) in identification of reasons for peripheral subsystem and data processing system failures. In such problem determination, it is critical that data processing events, either in the peripheral subsystem, data or host processor or both, preceding a data processing failure event be quickly and easily identified. Such identification has been difficult because there is no time correlation of error logs kept in a subsystem and error logs kept in a host processor relating to such data processing events. Therefore, it is desired to easily and inexpensively provide for adequate time correlation between the error logs in diverse programmed units, such as peripheral subsystems and host processors in a multi-host data processing system or installation.

Another problem solved by practicing this invention is an efficient way of preserving data integrity in a multi-processor environment or multi-installation environment. Data integrity means that the status of the data is known. Data integrity is not to be confused with error detection and correction systems that maintain data error free. Rather, the update status, data and time of data updates, is a data record current and accurate, and the like. This problem can create difficulties in reconstructing data after a system failure for example or when data files are shared, either within one installation or between plural data processing installations. Each host processor user accessing a data files should have means for assuring such user of the status of data integrity. To this end, time correlation of the data with events or other data can be critical. Therefore, it is desired to provide time indication of data for preserving data integrity.

Other data processing events in a data processing system or installation may need time correlation. It is therefore desired to extend time indications, such as time stamps, from host processors to include peripheral subsystems such that all programmed units of the data processing system or installation participate in maintaining information showing time correlation of data processing events. While a clock line could be added to tie in all units, such expense and complication is made unnecessary by practicing the present invention.

DISCUSSION OF THE PRIOR ART

The Milligan et al U.S. Pat. No. 4,410,942 shows a magnetic-tape data-storing peripheral subsystem having a rate-changing buffer. This patent shows and claims a SYNCHRONIZE channel command issued by a host processor to the peripheral subsystem for synchronizing operations of the rate changing buffer, hence a virtual position of the data-storing magnetic tape, to host processor operations. While two programmed units of a data processing installation are then synchronized as to operation status, such synchronization does not provide for time correlation of many data processing events occurring in the host processor and the peripheral subsystem.

The Hartung U.S. Pat. No. 4,574,346 shows a cached data-storing peripheral subsystem employing direct access storage devices (DASD). Included in the technical description is a plurality of channel commands issued by a host processor to a peripheral subsystem that are now termed SET SUBSYSTEM FUNCTION (SSF). In the Hartung patent the commands EUA, ERC and ADS are examples of SSF host processor issued channel commands. The preferred embodiment of this invention employs SSF channel commands in implementing the present invention. Such SSF channel commands are substantially different from the Hartung commands EUA, ERC and ADS.

SUMMARY OF THE INVENTION

An object of the present invention is to provide method and apparatus in a data processing system in which loosely coupled programmed units of the environment have time correlation of predetermined data processing events.

In accordance with the present invention, a time of day clock in a host processor portion of a data processing system is read to obtain a current host time. Such current host time may be for all hosts (host times are synchronized) or only for one of several hosts (host times are not synchronized). The current host time is supplied to a peripheral subsystem as a host time stamp. The peripheral subsystem stores the host time stamp with current clock time(s) of a peripheral subsystem in a time-correlating entry of a data storage portion of the peripheral subsystem. The peripheral subsystem detects and indicates predetermined data processing events. An indication of each detected and indicated predetermined data processing event is stored in a predetermined entry of a log or file, along with an event time stamp created by reading a peripheral subsystem clock.

In one embodiment of the invention, the predetermined data processing event is a detected error condition in the peripheral subsystem, the data storage system is an error log and the event time stamp and an indication of the error event are stored as one entry of the error log.. The time-correlating entry is stored as a separate entry in such error log. Problem determination includes correlating the recorded error event to the host time of day by calculating the host time of day that correlates to the event time stamp by adding the difference between the host time stamp and the peripheral clock time stamp in the time-correlating entry. When host times are not synchronized, such time correlation may include correlating host times not synchronized to the host time stamp with a host time that is synchronized to the host time stamp.

In another embodiment of the invention, the data processing event is recording data in a file, such as updating the file at each recording, including each updating, the peripheral clock is read and a recording event time stamp is recorded in the file for indicating time of recording. Upon problem determination, the recording event time stamp is correlated to the host time of day as set forth above.

The foregoing and other objects, features and advantages of the invention will be apparent from the following more particular description of preferred embodiments of the invention, as illustrated in the accompanying drawings.

DETAILED DESCRIPTION

Figure 1:
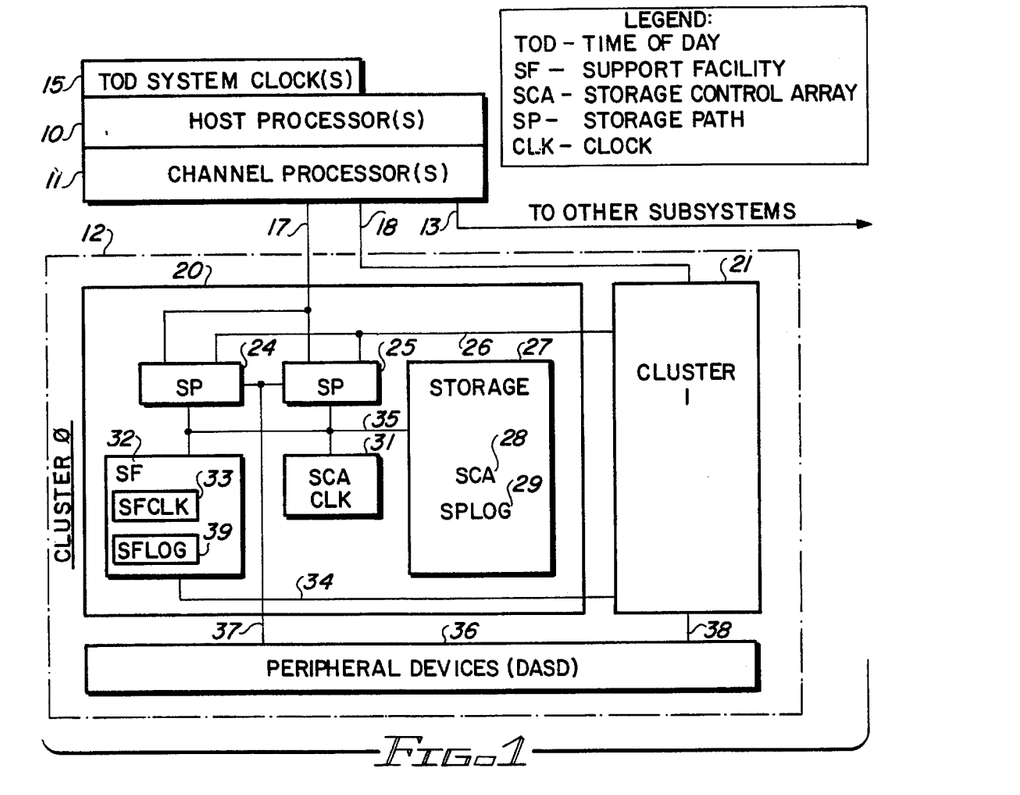
FIG. 1 illustrates a data processing system that employs the present invention.

Referring now more particularly to the appended drawing, like numerals indicate like parts and structural features in the various figures. FIG. 1 illustrates a data processing system employing the present invention. Host processors 10 have a plurality of channel processors 11 connected to a peripheral subsystem 12 via sets of peripheral data channels 17 and 18. Host processors 10 have time-of-day (TOD) clock(s) 15 that provides a reference time to all of the host processors. In many data processing system, one or more such TOD clocks are employed. If a plurality of such TOD clocks are used, such clocks are carefully synchronized such that all host processors 10 have a common system time reference. Numerals 17 and 18 respectively indicate a plurality of data channels that employ path grouping. Each host process may be a member of one path group. Similarly, each path group is associated with one host processor. Such path grouping enables a host processor command to be sent to peripheral subsystem 12 via one channel path while peripheral subsystem 12 responds to the host processor command over a different channel path. The document incorporated by reference illustrates such path groups and path group identifications (PGID's). Many data processing systems sold by International Business Machines Corp. (IBM) employ such path grouping. Included in lines 13, 17 and 18 are data channel adapters in the respective channel processors and clusters, as is known. Numeral 13 indicates connects to other subsystems (not shown). The data channel connections between host processors 10 and peripheral subsystem 12 and peripheral subsystem 13 may be shared between the host processor and the peripheral subsystems.

Peripheral subsystem 12 includes two clusters 20 and 21, also termed cluster 0 and cluster 1. Since both clusters are identical, only cluster 0 is detailed to an extent for understanding the present invention. Cluster 1 is a replica or duplicate of cluster 0. Each cluster has a set of storage paths (SP) 24 and 25 that respectively perform many functions that are performed in what has been termed a control unit or peripheral controller, in particular a signal processing portion of such control unit or peripheral controller. To this end, storage path 24 and 25 each are connected to the data channel paths indicated by numeral 17 while the storage paths of cluster 1 are connected to the data channel paths indicated by numeral 18. Storage paths 24 and 25 communicate with cluster 1 storage paths via cable 26, and vice versa.

Peripheral subsystem 12 includes subsystem storage 27, a random access memory. Caching is performed in subsystem storage 27 in a usual manner. System Control Array (SCA) 28 and SPLOG 29 may be either a separate data storage or resident in subsystem storage 27. SCA 28 stores peripheral subsystem 12 information. In addition to the SCA 28, electronic circuits perform predetermined peripheral subsystem 12 functions beyond the scope of this description. One portion of the SCA circuits is subsystem digital clock SCACLK 31. This electronic digital clock is a continuously operating counter that indicates time elapsed from power-on sequencing or from counter overflow.

Support facility (SF) 32 is a programmed portion of cluster 20 that performs maintenance related operations and manages initial microprogram loading (IML). SF 32 records data processing error events in SFLOG 39 (a separate data storage means in SF 32), as will become apparent. Such data processing error events include errors detected and indicated in peripheral devices 36, as is usual, and any portion of the clusters 20 and 21. The actual error detection preferably occurs outside of support facility 32; such detection is reported to support facility 32 for recording in SFLOG 39. Periodically or upon a command (not described), support facility 32 transfers the contents of SFLOG 39 to a peripheral disk (not shown) as an archive copy for later possible use by maintenance personnel or separate access by an automated maintenance facility (not shown) of the data processing system that may be either a program in a host processor 10 or a separate facility (not shown). As later described, a host processor 10 accesses later described logs for performing problem determinations. Such accessing is achieved either by a maintenance person taking a copy of the log(s) for computer assisted problem determination or by a host processor accessing the "archive" contents of SFLOG. Host processor 10 may execute programs assisting the maintenance person, therefore the invention is described in terms of a host processor accessing such logs, as will become apparent.

Support facility 32 includes continuously operating digital clock (electronic counter) SFCLK 33. SFCLK 33 provides, inter alia, time of entry time stamps in SFLOG 39, as will become apparent. Storage paths 24 and 25 temporarily record events in SPLOG 29. Support facility 32 later accesses SPLOG 29 for updating its SFLOG 39. Alternately, storage paths 24 and 25 can transmit messages directly to support facility 32 for actuating it to update SFLOG 39.

Cluster bus 35 interconnects storage paths 24 and 25, storage 27 and support facility 32. Support facility 32 is connected by data path 34 to the support facility (not shown) of cluster 21. This connection enables support facility 32 to synchronize its SFCLK 33 with the SFCLK (not shown) of cluster 21. This synchronization enables recovery from a later described overwrite of time stamps in SPLOG 29.

Peripheral subsystem 12 also includes a plurality of peripheral devices 36, which in the illustrated embodiment are data storing disk devices also termed "direct access storage device" (DASD). Device connections 37 and 38 connect storage paths 24 and 25 and the storage paths of cluster 21 to the devices 36 in a usual manner.

In accordance with one aspect of the present invention, unique data channel 17, 18 transferred commands and messages (FIG. 2) are used in the FIG. 1 illustrated data processing system for enabling a time correlation of time stamps in the peripheral subsystem 12 with time stamps in host processors 10. Such time correlation assists in problem determinations. In effecting enabling the time correlation, peripheral subsystem 12 upon detecting later-described data processing events requests host processors 10 to supply a current time of the TOD clock 15 as a host time stamp. Peripheral subsystem 12 responds to the predetermined data processing events to send a data channel attention message (ATT'N) 40 to host processors 10 over a selected path group for requesting a host processor 10 to send a host time stamp. Message 40 includes message identifying field 41 having code "ATT'N". Field 42 (also termed a command 41 modifier) contains an indicator that data are appended as a message together with a message identification number (MSGID). Field 43 contains the message "request system time" (RST). This attention message requests that the target host processor 10 read its TOD clock 15 and send the read current TOD to peripheral subsystem 12 as a "host time stamp". The host time stamp is used, as later described, to time correlate logged data processing events occurring in peripheral subsystem 12 (as time stamped) with logged data processing events (time stamped via TOD clock 15) logged in host processors 10 logs (not shown). The target host processor 10 responds to the message 40 by sending a SET SUBSYSTEM FUNCTION channel command (SSF) 45. SSF 45 indicates to peripheral subsystem 12 the current time of a target (the term target indicates the host processor 10 that received SSF 45) host's TOD clock 15 as a host time stamp. Field 46 identifies the channel command as SSF. Field 47 indicates that the channel command 45 is a "set system time (SST)" command. Field 48 contains the host time stamp (TS) as a current time value of its TOD clock 15. If all or several host processor TOD clocks are synchronized to the supplied host time stamp, then the host time stamp applies to operations of all host processors. If the several host processors have TOD clocks with non-synchronized times, then for problem determination and error recovery, a time correlation between the host processor times and the supplied host time stamp is required. Such time-stamp correlation is beyond the present description. Further, several host processors may independently supply their respective host time stamps, as will become apparent. For identifying a host processor with the peripheral subsystem 12 stored host time stamp, field 49 contains a serial number identification of the host processor sending SSF 45. Such serial number identification is preferably a "hardware" serial number termed CPUID, i.e. central processing unit identification. Each host processor includes or executes on at least one central processing unit, often termed a CPU.

Figure 2:
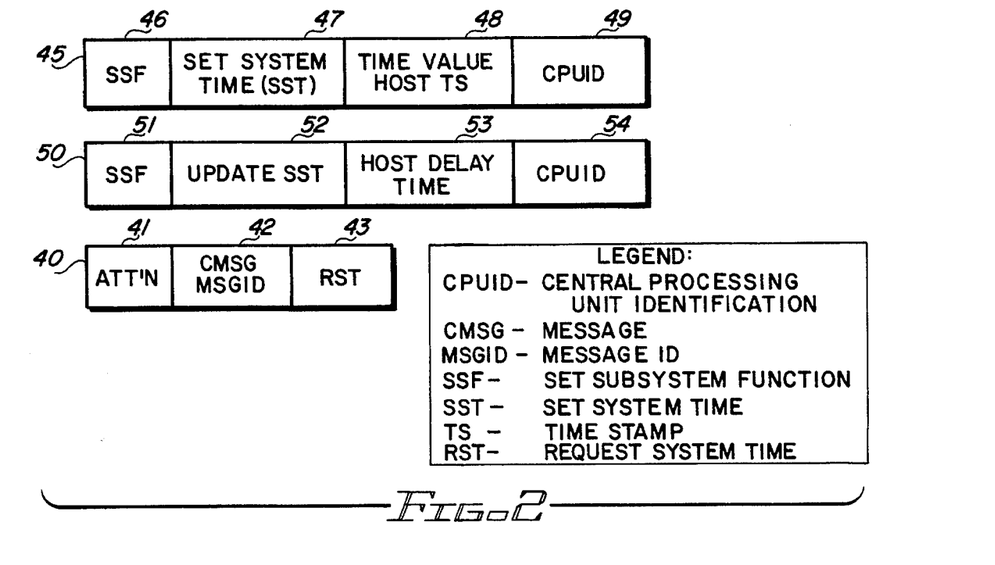
FIG. 2 shows three data-channel commands that usable in a data channel of the FIG. 1 illustrated data processing system for practicing the present invention.

SSF 45 is queued in main memory to be fetched for transfer to peripheral subsystem 12 by a channel processor 11. Queue and other time delays in transferring SSF 45 to peripheral subsystem 12 are determined, as later described, for ensuring accuracy in time correlating peripheral subsystem 12 time stamps with the TOD clock 15 time. This main memory queue is for all channel commands awaiting for a channel processor 11 for being transferred over data channels 17 or 18 with other channel commands (not shown). Such queuing and a current work load of channel processors 11 may cause a variable and significant delay of the SSF 45 processing in the target host processor 10 before SSF 45 is actually sent to peripheral subsystem 12. Therefore, the target host processor 10 determines the queue delay time in a channel processor 11 used to transfer SSF 45. If the delay is greater than an acceptable delay, then target host processor 10 sends time stamp update SSF channel command 50 to peripheral subsystem 12. SSF channel command 50 has command field 51 indicating it is an SSF channel command. Field 52 indicates that the target host processor 10 is updating the host time stamp sent by SSF channel command 45. Field 53 contains the host delay time stamp either in a form of the TOD 15 time that SSF channel command 45 was in fact sent or an indication of the actual queue and other time delays, if any (the preferred content). Field 54 contains the CPUID of the host processor sending SSF 50. This field enables support facility 32 to update the host time stamp, as later described.

Figures 3, 4:
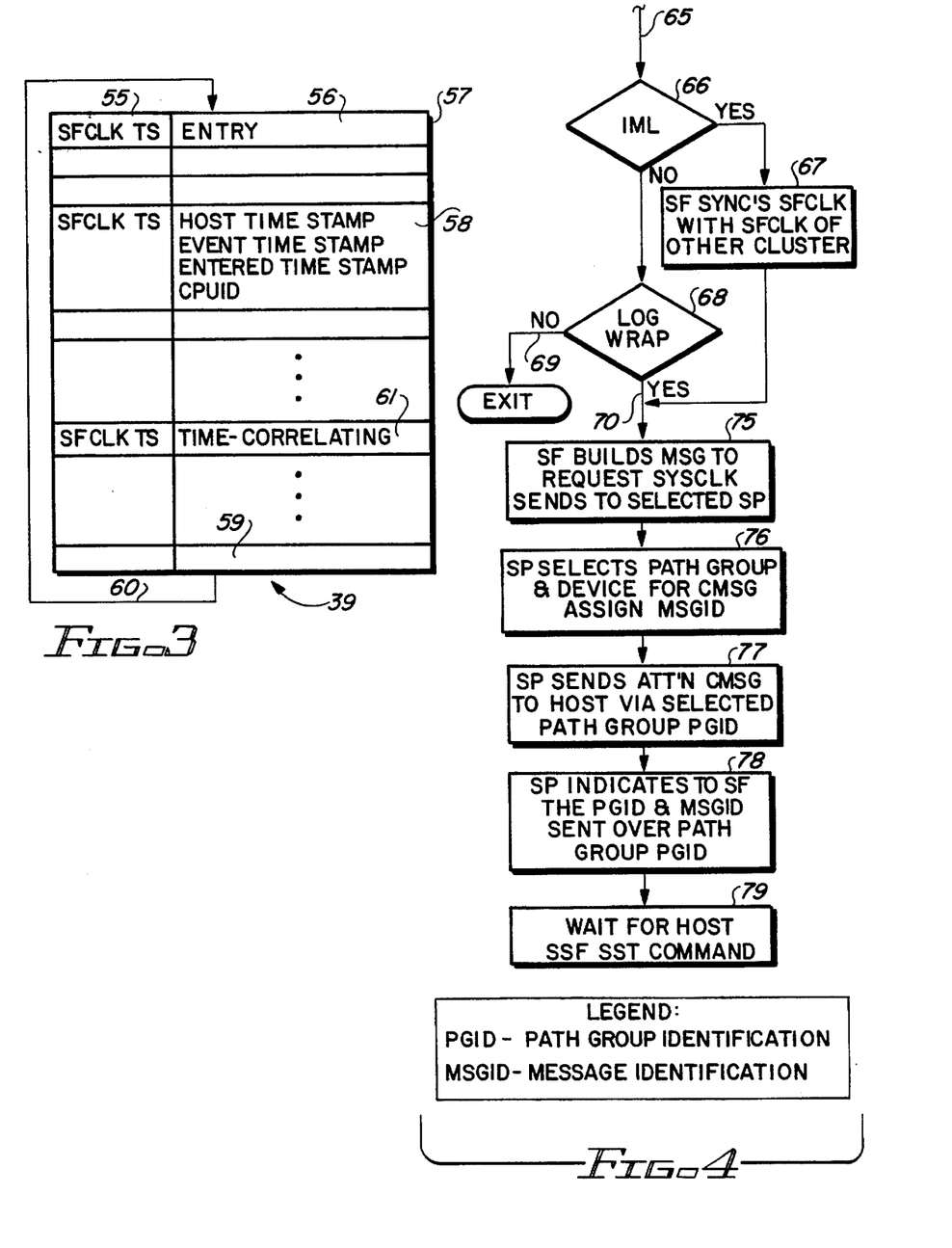
FIG. 3 illustrates an error-log data-storage system used in the FIG. 1 illustrated environment.
FIG. 4 is a flow chart showing operations of the FIG. 1 illustrated data processing system for transferring a host time stamp to a peripheral subsystem.

FIG. 3 illustrates the error entry storage in SFLOG 39. While SPLOG 29 is an allocated area of storage system 27, SFLOG 39 is a separate memory in support facility 32. SFLOG 39 is formatted into two logical columns 55 and 56. Column 55, in each LOG entry, stores the then current time of SFCLK 33 as a time stamp for the entry. Such SFCLK time stamp (SFCLK TS) is an accurate indication of when the entry was stored in SFLOG 39 by support facility 32. Column 56 contains the data constituting the entry, as indicated at 57. In a constructed embodiment, SFLOG 39 stores error related and other subsystem data in column 56. At least one of the SFLOG 39 entries is a time-correlating entry, such as entry 58. This entry includes the SFCLK time stamp in column 55 indicating the SFCLK clock time as the time-correlating entry was recorded in SFLOG 39. Therefore, the column 55 portion of entry 58 identifies the relative time of the time-correlating entry 58 with all other entries in SFLOG 39. The column 56 portion of time-correlating entry 58 has three time stamps for enabling calculation of the relative time of occurrence of any log entry in SFLOG 39. Further, support facility 32 synchronizes the SFCLK of cluster 1 with the SFCLK of cluster 0. Therefore, as later described, all SFLOG entries in both clusters are time correlated using either time-correlating entry of clusters 20 and 21.

The three time stamps in the column 56 portion of time-correlating entry include the host time stamp received with SSF channel command 45. The event time stamp in the column 56 portion indicates, as later described, the time storage path 24 or 25 received SSF channel command 45 is indicated by SCACLK 31. The third time stamp is the entered time stamp that indicates the SCACLK 31 time when support facility 32 actually stored the entry in SFLOG 39. As will be seen, simple calculations can time relate any entry in SFLOG 39 to the host TOD clock 15. SFCLK time stamp in entry 58 is subtracted from the host time stamp value for yielding the time difference between the support facility 32 time and the host TOD clock 15 time. Since SFCLK 33 may employ a longer time interval per digital count than TOD clock 15 or SCACLK 31 (i.e larger time granularity, hence less time accuracy), the time-correlating calculations are limited to the accuracy of the SFCLK 33. After the subtraction, the SFCLK time stamp for a log entry of interest (not shown) is then time correlated to the TOD clock 15 by adding the clock difference to the SFCLK time stamp in the log entry of interest. Similar calculations can also be performed for time correlating the SCACLK times to the TOD clock.

The CPUID received in SSF 45 field 49 is also stored in time-correlating entry 58. This logging enables time correlating peripheral subsystem logged events by any host processor 10 whether or not the host processor TOD clocks 15 are synchronized or not. Such time correlating procedures are known and are beyond the scope of this description.

SFLOG 39 is operated in a round-robin manner. That is, the top-most entry location at numeral 57 is first used, then the next entry location is used, etc, until a last-entry location at 59 is used. The next entry location to be used for recording is at numeral 57, as schematically indicated by line 60. The original entry in entry location 57 is overwritten. This data processing event is termed "LOG wrap". LOG wrap, as later described, is a data processing event that initiates peripheral subsystem 12 requesting a host time stamp.

SFLOG 39 may contain more than one time correlating entry. For example, a second time-correlating entry 61 may contain a second host time stamp from either a second host processor different from the host processor that sent the host time stamp in entry 58. The second host time stamp may also be the host processor that send the time-correlating entry 58 host time stamp.

In some instances, time-correlating entry 58 may be positioned at entry location 57. In this situation, a LOG wrap results in immediately overwriting the time-correlating entry. As shown, some SFLOG 39 entries were made after power-on or initial microprogram load (IML) resulting in the time-correlating entry being displaced from the first entry location 57. For example, IML may have resulted in error logging activity before the host time stamp is received. IML is a procedure for initializing the respective clusters. The IML is performed in peripheral subsystem under control of support facility 32 to initialize all elements of the subsystem and respective clusters.

An important aspect of the present invention is that peripheral subsystem 12 requests a host time stamp to be sent. FIG. 4 illustrates the machine operations for effecting the request that use the FIG. 2 illustrated SSF channel commands 45 and 50 and the attention message 40. All of the FIG. 4 illustrated machine operations occur in peripheral subsystem 12. Support facility 32 as a part of its operations (most are not described as such operations do not pertain to the present invention) follows program execution path 65. At machine step 66, support facility 32 determines whether or not an IML was just completed. If yes, then support facility 32 at machine step 67 synchronizes its SFCLK 33 with the SFCLK (not shown) of cluster 21. Such SFCLK synchronization occurs via path 34 (FIG. 1) using usual clock synchronizing techniques. If at machine step 66 support facility 32 determines there has been no recent completion of an IML, support facility 32 executes machine step 68 for determining an occurrence of a LOG wrap data processing event. If there was no LOG wrap event(FIG. 3), then support facility 32 proceeds via program path 69 to EXIT for performing machine operations not pertinent to the present invention. If a LOG wrap data processing event occurred or an IML data processing event was detected at machine step 66, then support facility 32 initiates a request for a host time stamp to a storage path 24/25 selected host processor 10. Support facility 32 in machine step 75 builds an internal message (MSG) for one of the storage paths 24/25 to request a host time stamp. Support facility 32 may send MSG to SPLOG 29 whereat either storage path may access MSG and respond thereto. If the internal message is sent directly to a storage path 24/25, then such storage path is selected in any arbitrary manner. In either event, the selected storage path responds to the internal MSG in step 76 to build a data channel attention message (CMSG) 40 (FIG. 2) to request the host time stamp (system clock time or SYSCLK current time). As soon as the data channel attention message is built (as shown in FIG. 2), the selected storage path selects a path group for forwarding the message to a target host processor. The selection of an storage path to be used can be arbitrary. The selected storage path 24/25 in machine step 76 assigns a message identification MSGID to the data channel attention message. The MSGID is inserted by the selected storage path into field 42 of attention message 40. The selected storage path then sends the data channel attention message 40 over a path group to a target host processor 10. Such selection of a path group can be arbitrary, customer determined or otherwise indicated in peripheral subsystem 12 in a known manner. In any event, a path group is selected by selecting and indicating its PGID.

The selected storage path 24/25 at machine step 77 sends the data channel attention message 40 to a target or designated host processor 10 over the selected path group. Storage path 24/25 at machine step 78 indicates to support facility 32 the PGID and MSGID used in transferring the attention message to the target host processor 10. Then, as indicated in machine step 79, peripheral subsystem 12 proceeds to other machine operations while waiting for the SSF SST channel command 45.

Figure 5:
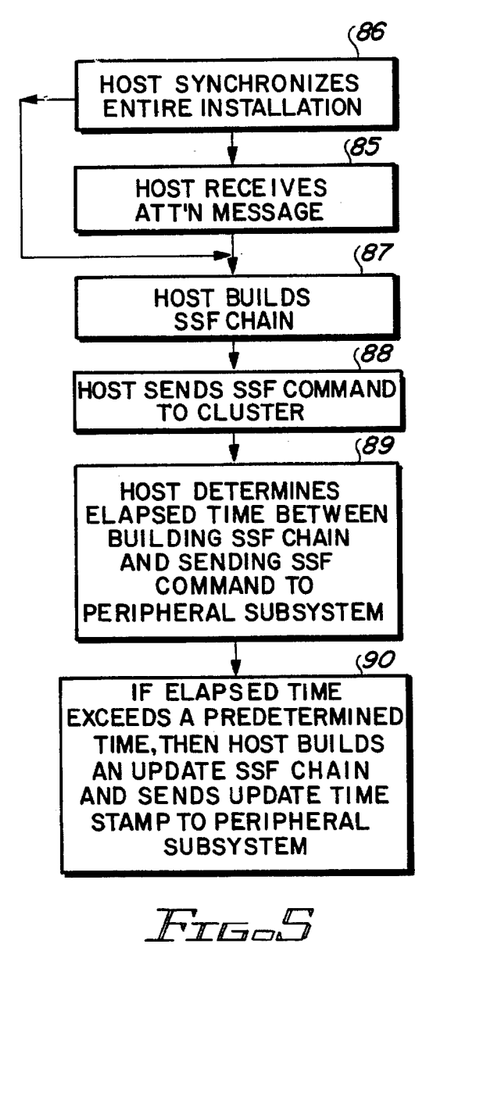
FIG. 5 is a flow chart showing operations of the FIG. 1 illustrated data processing environment in which a host processor corrects the host time stamp caused by delays in sending the host time stamp.

FIG. 5 illustrates a target host processor's operations that effect a transfer of the current TOD time of its clock 15 to peripheral subsystem 12. In a first initiation of such system time transfer and as a continuation of the FIG. 4 described operations, the selected host processor 10 in machine step 85 receives the attention message via one path in a path group of data channels 17, 18 and one of the channel processor 11. The attention message is stored in main memory (not shown) that the selected host processor 10 uses.

A second initiation of such system time transfer is host processor initiated in machine step 86. While the TOD clocks of all or some of host processors 10 can time synchronized such that all TOD clocks 15 have the same time not always occur. If such time synchronization is initiated by a host processor, a host processors 10 also can supply a new host time stamp to peripheral subsystem 12 and to other peripheral subsystems 13. For a host processor initiated transfer of the system time, a host processor 10 selects cluster(s) of a peripheral subsystem(s) (may include a device 36 address) for receiving a host time stamp.

A third initiation of the host time stamp transfer is also effected by peripheral subsystem 12. Support facility 32 can request a host time stamp as set forth in FIG. 4 based upon events other than IML or SFLOG 39 wrap, such as SFCLK 33 having timed a predetermined elapsed time. Then, the above-described machine steps of FIG. 4 are executed. Of course, other data processing events may be used to trigger peripheral subsystem 12 into requesting a host time stamp from host processors 10.

In any event, the target host processor 10 in machine step 87 builds a SSF chain of channel commands (such chain of channel commands is that chain used in many current IBM main frame processors) that includes SSF channel command 45 (FIG. 2). Such chain is recorded in the main memory (not shown) for accessing by a channel processor 11 for transmitting the commands over the path group selected as described with respect to FIG. 4.

Upon the host processor 10 completing the SSF chain, in machine step 88 the channel processor 11 takes the SSF chain commands and sends them over a data channel path to cluster 20. Since there is a queue for accessing the selected data channel path, a substantial delay may occur after the building of the SSF chain in machine step 87—the instant that the TOD of clock 15 is inserted into SSF channel command 45. As a result of such a queue-caused delay, the host time stamp may be inaccurate when peripheral subsystem 12 receives it. This inaccuracy makes the host time stamp less useful in the desired time correlation of data processing events. For example, a maximal permitted queue delay in host processor 10 may be selected in a range of zero seconds to three seconds. The time-stamp-sending host processor 10 in machine step 89 determines the queue delay. If the maximum permitted host queue delay is exceeded, then in machine step 90 an update SSF chain having channel command 50 is built and transmitted to peripheral subsystem 12. Selecting a maximum queue delay of zero ensures that an update SSF channel command 50 is always sent. Such a selection maximizes the accuracy of time correlation between host processors 10 and peripheral subsystem 12 logged activities.

Figure 6:
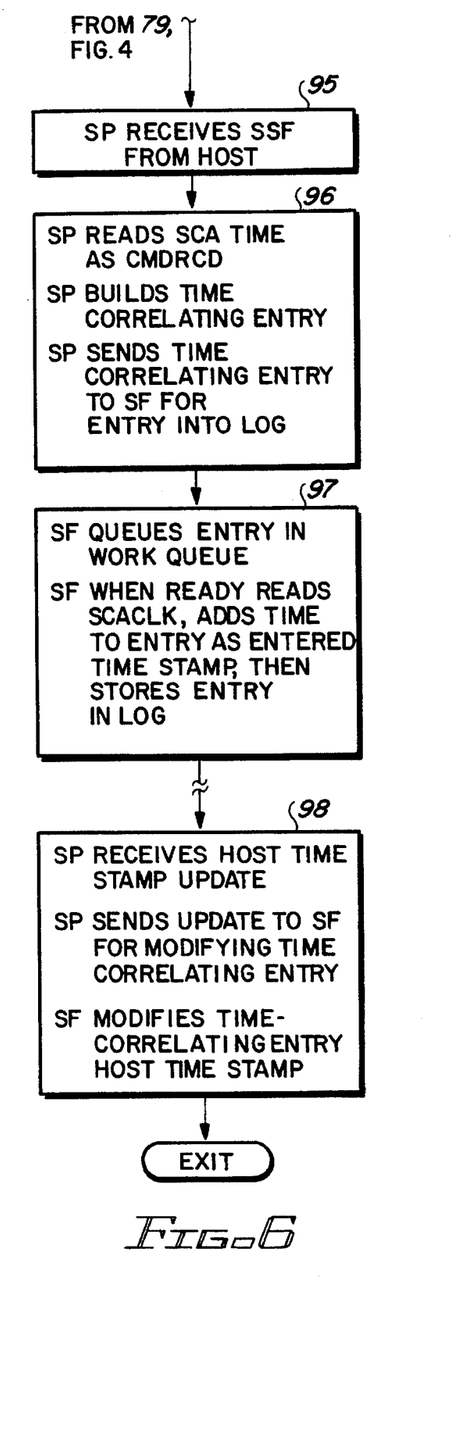
FIG. 6 is a flow chart showing operations of the FIG. 1 illustrated data processing system in a host processor for sending a host time stamp to a peripheral subsystem.

FIG. 6 shows machine operations conducted in peripheral subsystem 12 that store the received host time stamp in SFLOG 39. The FIG. 6 illustrated operations begin from the waiting step 79 of FIG. 4. At machine step 95, either storage path 24 or 25 (selection of the selected storage path to process a received command is determined in a usual known manner beyond the scope of the present description) receive SSF 45. At machine step 96, storage path reads the current time of SCACLK to indicate the peripheral subsystem 12 time of receipt of SSF 45 for entering the SCACLK time as the event time stamp of entry 58. The SSF 45 receiving storage path builds a future time-correlating entry (not shown) to become the column 57 portion of entry 58 (FIG. 3) in SFLOG 39. The host time stamp (system clock time in field 48 of SSF channel command 45), CPUID and the current time of SCACLK are entered by the storage path into the future time-correlating entry. This future time-correlating entry is temporarily stored in SPLOG 29 for later accessing (queued) by support facility 32. Support facility 32 in machine step 97 accesses the SPLOG 29 for retrieving the storage path built future time-correlating entry. As support facility 32 becomes ready to actually store the time-correlating entry into SFLOG 39, support facility 32 reads SCACLK to obtain the current peripheral subsystem 12 time. Support facility 32 then adds the current SFCLK time as the entered time stamp, then records the time-correlating entry into SPLOG 29 as entry 58. At this time, support facility 32 does not know whether or not an update SSF channel command 50 will be received. Accordingly, support facility 32 proceeds to other operations (not shown).

Assuming that the target host processor 10 executes machine step 90, then in machine step 98 a storage path receives the SSF 50 host time stamp update. The updated TOD time is then sent to support facility 32 via SPLOG 29 for updating the host time stamp value in time-correlating entry 58. Support facility 32 receives the host delay time and adds the host delay time to the host time stamp stored in entry 58. The other time stamps in time-correlating entry 58 do not change.

From the above description, it is seen that the selected host processor 10 removes a time error introduced by queue delays resulting from a channel processor not being able to immediately send the SSF channel command 45 immediately to peripheral subsystem 12. Similarly, the event time stamp (SCACLK time indicating time of receipt of the host time stamp) is time correlated to the host time stamp whether or not updated. The entered time stamp (SCACLK time of entry) indicates the SFCLK TS value occurred at the entered time stamp. Therefore, the time delay error caused by the support facility 32 work queue (storage time in SPLOG 29) is compensated by deducting from the SFCLK TS value the queued delay indicated by subtracting the event time stamp (time of command receipt by peripheral subsystem 12) from the entered time stamp value. Therefore, all time stamps are precisely time correlated to the accuracy determined by queue measurements and delay compensation effected by the above-described calculations.

From all of the above, it is seen that the host time stamp transfer using usual channel command processing may incur undesired delays that create time-correlating errors in a desired time correlation. Even the support facility 32 work queue delay can create time-correlating errors. The present invention compensates for such timing delays in a host processor and peripheral subsystem. It is also to be appreciated that the TOD clock 15 may having a timing interval of one microsecond or less while SFCLK 31 may have a minimum time interval of one millisecond or less. The time stamp accuracies are limited to the largest granularity of any of the clocks used to create time stamps.

Figure 7:
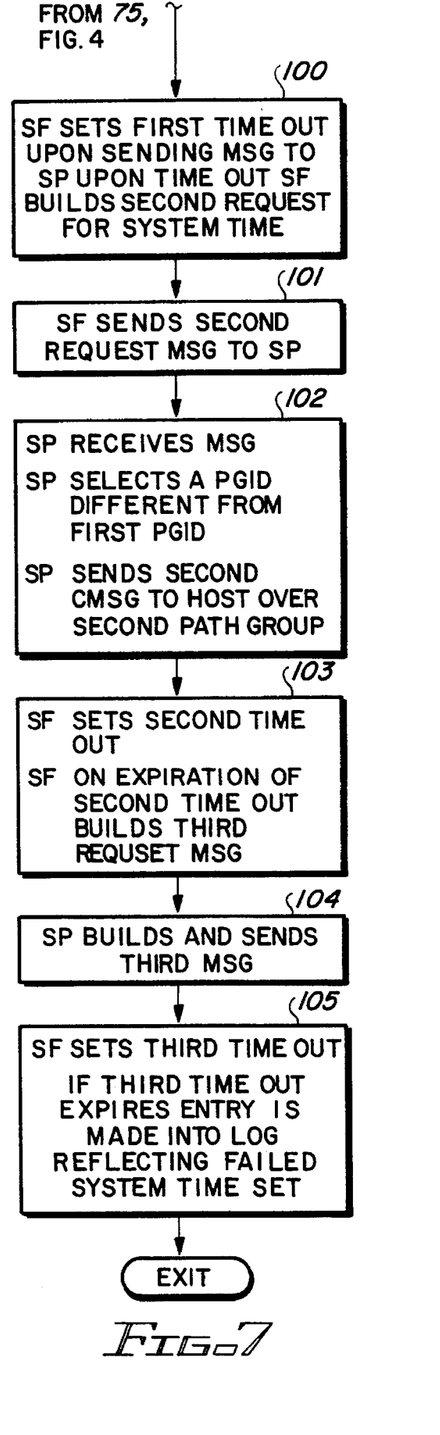
FIG. 7 is a flow chart showing operations of the FIG. 1 illustrated data processing system in a peripheral subsystem in which a host time stamp is not promptly transferred to the peripheral subsystem.

FIG. 7 illustrates three retries when a host processor 10 does not respond to a request for a host time stamp. The FIG. 7 illustrated operations in support facility 32 begin after machine step 75 of FIG. 4 in which support facility 32 sent a first request for the host time stamp to storage path 24/25. Support facility 32 in machine step 100 sets a first time out (preferably several minutes) to set a first time period for expecting a response from storage path 24/25, such as shown in FIG. 6 at machine step 96. Returning to machine step 100, support facility 32 upon detecting a time out without receiving a host time stamp, proceeds to machine step 101 for sending a second internal message to a storage path to send a data channel attention message 40 requesting for a host time stamp. A selected storage path 24/25 in machine step 102 selects a path group PGID (2) that is different from the PGID path group selected in machine step 76 (FIG. 4) for the first request. This action may also select a second host processor 10 by selecting a second path group for supplying a host time stamp. The second selected storage path transfers the second attention message 40(identical to the first attention message) to the second selected host processor 10. Then, support facility 32 at machine step 102 sets a second time out that has a longer time period than the first time out, such as one hour or the period of time measured by SCACLK 31, for example.

In machine step 103, if storage path 32 detects the second time out expires, storage path 32 then resends the host time stamp request a third time to a storage path 24/25. Storage path 24/25 at machine step 104 selects a third PGID (if there is one) and sends the third request to a third selected host processor 10 via a third path group. Support facility 32 in machine step 105 sets a third time out, that may be equal to or longer than the second time out. If in machine step 105 the third time out expires, then support facility 32 builds a time-stamp error entry for SFLOG 39 indicating or reflecting that three requests to host processors 10 failed to obtain a host time stamp. After storing the time-stamp error entry in SFLOG 39, support facility 32 exits the FIG. 7 illustrated operations for performing operations not pertinent to the present invention.

Figure 8:
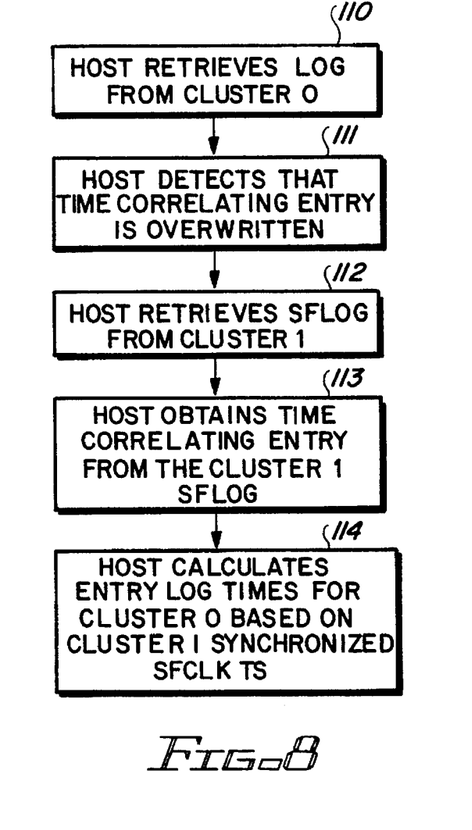
FIG. 8 is a flow chart showing operations of the FIG. 1 illustrated data processing system for recovering from an overwrite of a time-correlating entry in an error log.

FIG. 8 illustrates a portion of a computer assisted problem determination procedure that employs the present invention for effecting time correlation of a SFLOG 39 entry with a host processor 10 log when the time-correlating entry 58 has been overwritten after a LOG wrap and has not been replaced. It is to be understood that problem determination includes steps beyond the scope of the present description. In the FIG. 8 illustrated situation, a time-correlating entry usually stored in SFLOG 39 is absent. This absence means that the log entries of SFLOG 39 cannot be time correlated with host processor 10 time stamps. Because the SFCLKs of clusters 0 and 1 were synchronized at IML (FIG. 1 path 34), as described below, any host processor 10 may access the SFLOG of cluster 1, or its archive copy, for recovering from the time-stamp error of SFLOG 39 in cluster 0, or its archive copy.

At machine step 110 a host processor 10 retrieves either the contents of SFLOG 39 in cluster, or archive copy. At machine step 111 the host processor 10 detects that the time-correlating entry 58 was overwritten. Then, as a first step in recovering from the time-stamp error, at machine step 112 host processor 10 retrieves either the LOG from cluster 1 or its archive copy. At machine step 113, host processor 10 reads the cluster 1 time-correlating entry. At machine step 114, host processor 10 calculates the time correlation of the cluster 0 SFLOG 39 current or former contents for continuing in a problem determination procedure. It is to be noted that a LOG wrap in either LOG of cluster 0 or 1 may result in an overwriting the respective time-correlating entry. The probability of both time-correlation entries being simultaneously overwritten is believed to be quite small.

While the invention has been particularly shown and described with reference to preferred embodiments thereof, it will be understood by those skilled in the art that various changes in form and details may be made therein without departing from the spirit and scope of the invention.

What is claimed is:

1. A data processing (DP) system having two DP means, said two DP means comprising host processor DP means and peripheral subsystem DP means, data channel means connecting the host processor DP means to the peripheral subsystem DP means for exchanging control information and data therebetween, said host processor DP means having a time of day clock, a data storage means in the peripheral subsystem DP means;

the improvement including, in combination:

a peripheral time clock in the peripheral subsystem DP means that continuously operates for indicating a peripheral time in the peripheral subsystem DP means;

time stamping means in the peripheral subsystem DP means connected to the peripheral time clock for reading said peripheral time for storing in said data storage means said read peripheral time as a logging time stamp;

a first one of said DP means, via said data channel means, sending a correlation request to a second one of said DP means, said host processor DP means is to send, via said data channel means, a current time of said current time of say indication to said time stamping means, said host processor DP means responding to said correlation request to read said current time of day indication and then send said read current time of delay indication as a host time stamp to said peripheral subsystem DP means via said data channel means;

said time stamping means being connected to said data channel means for receiving said host time stamp, said time stamping means connected to said peripheral time clock, said time stamping means responding to receiving said host time stamp to read a current time of said peripheral time clock for generating a time-event logging time stamp and recording both said host time correlating entry in said data storage means; and data processing event means connected to said data storage means and to said time stamping means for recording in said data storage means a second read time of said peripheral time clock as a predetermined logging time stamp plus data indicating a predetermined data processing event.

2. In the DP system set forth in claim 1 further including, in combination:

error logging means in said peripheral subsystem DP means for detecting and indicating predetermined data processing error events occurring in said peripheral subsystem DP means and being connected to said data processing event means for supplying indications of said predetermined data processing error events for recording in said data storage means as said event entry.

3. In the DP system set forth in claim 2 further including, in combination:

problem determination means in said host processor DP means connected to said data channel means for sending a command to said peripheral subsystem DP means to read and send to the problem determination means the contents, including said time-correlating entry, of said data storage means;

said peripheral subsystem DP means having means responding to said read command to read the contents of said data storage means and transfer a copy of said contents to said problem determination means via said data channel; and said problem determination means reading said predetermined entry portion and said time-correlating entry of said copy for relating in time said predetermined data processing event with a host predetermined data processing event that occurred at time indicated by said second read time.

4. In the DP system set forth in claim 1 further including, in combination:

said peripheral clock including a first clock portion and a second clock portion;

said first clock portion for generating a first peripheral time indication that is incremented at a first given periodicity;

said second clock portion for generating a second peripheral time indication that is incremented at a second given periodicity;

said time stamping means being connected to said first clock portion for receiving said first peripheral time indication for storing said received first peripheral time indication in said data storage means as said logging time stamp; and said time stamping means being connected to said second clock portion and being responsive to receiving said host time stamp for receiving said second time indication for storing said received second time indication in said time-correlating entry as an event time stamp.

5. In the DP system set forth in claim 4 further including, in combination:

said time stamping means including queue means, said queue means receiving and storing said time-correlating entry prior to said time stamping means storing said receive time-correlating entry in said data storage means; and said time stamping means receiving said second peripheral time indication from said second peripheral clock portion and entering the received second peripheral clock portion time indication into said time-correlating entry as an entered time stamp, then storing said time correlating entry in said data storage means.

6. In the DP system set forth in claim 5 further including, in combination:

said peripheral subsystem DP means being said first one of said DP means;

time stamp request means in said time stamping means having initiation means for sending said correlation request to said host processor DP means via said data channel means to said host processor DP means to send to the time stamping means said read current host time stamp.

7. In the DP system set forth in claim 6 further including, in combination:

said data storage means having a LOG portion in which said time-correlating entry is stored;

said LOG portion being a round-robin storage array having a LOG wrap status after which old entries are overwritten by new entries; and said LOG wrap status being said predetermined data processing event.

8. In the DP system set forth in claim 6 further including, in combination:

initial-program-load means in the peripheral subsystem for initializing the peripheral subsystem DP means; and said initial-program-load means initializing the peripheral subsystem DP means being said predetermined data processing event.

9. In the DP system set forth in claim 6 further including, in combination:

error logging means in said peripheral subsystem DP means for detecting and indicating predetermined data processing error events occurring in said peripheral subsystem DP means and being connected to said data processing event means for supplying indications of said predetermined data processing error events for recording in said data storage means as said predetermined data processing event;

said peripheral subsystem DP means having a data-storage cluster 0 that includes said peripheral time clock including said first and second clock portions, said time stamping means, said data processing event means, said data storage means and said error logging means;

a plurality of peripheral devices connected to said data-storage cluster 0 such that said data-storage cluster 0 provides a data transfer between said peripheral devices and said data channel means; and said error logging means detecting and indicating data processing error events occurring in any one of said peripheral devices.

10. In the DP system set forth in claim 9 further including, in combination:

said peripheral subsystem DP means having a data-storage cluster 1 connected to said host processor DP means via said data channel means, said data-storage cluster 1 having replica peripheral clock including replica first and second clock portions, replica time stamping means, replica data processing event means, replica data storage means including a replica time-correlating entry and replica error logging means;

said plurality of peripheral devices connected to said data-storage cluster 1 such that said data-storage cluster 1 provides a data transfer path between said peripheral devices and said data channel means;

said error logging means detecting and indicating data processing error events occurring in any one of said peripheral devices; and said data-storage cluster 0 first clock portion being connected to said replica first clock portion and means for synchronizing said data-storage cluster 0 first clock portion with said replica first clock portion.

11. In the DP system set forth in claim 10 further including, in combination:

problem determination means in said host processor DP means connected to said data channel means for sending a command to said data-storage cluster 0 to read and send to the problem determination means the contents of said data-storage cluster 0 said time-correlating entry stored in said data-storage cluster 0 storage means;

said peripheral subsystem DP means having means responding to said read command to read the content of said data-storage cluster 0 data storage means and transfer a copy of said time-correlating entry to said problem determination means via said data channel means; and said problem determination means reading said data-storage cluster 0 time-correlating entry for relating in time said data-storage cluster 0 predetermined data processing event with a host predetermined data processing event.

12. In the DP system set forth in claim 11 further including, in combination:

said data-storage cluster 0 data storage means including a data array for storing said event and time-correlating entries wherein said data array is subject to overwriting and destroying predetermined ones of said entries including said time-correlating entry;

said problem determination means including means for detecting and indicating an absence of said data-storage cluster 0 time-correlating entry in said contents read from said data-storage cluster 0 data storage means;

said problem determination means having recovery means responding to said indicated absence of said data-storage cluster 0 time-correlating entry for reading contents of said replica data storage means including reading said replica time-correlating entry; and said problem determination means recovery means relating the host time stamps in said replica time-correlating entry with the host time stamps in said data-storage cluster 0 time-correlating entry for relating the data-storage cluster 0 logged event entry with said host predetermined data processing event.

13. In the DP system set forth in claim 1 further including, in combination:

command queue means in said host processor DP means for receiving and temporarily storing said host time stamp before sending the host time stamp to the peripheral subsystem DP means;

update means in said host processor DP means connected to the command queue means for determining a time duration said host time stamp was stored in said command queue means, threshold means in the update means for indicating a maximum permitted time duration, second transmission means in the update means responsive to said determined time duration being greater than said maximum permitted time duration for generating an update time value and sending said update time value to said time stamping means via said data channel means; and said time stamping means being connected to said update means via said data channel means and being responsive to said update time value to access said time-correlating entry for changing said host time stamp to add said update time value to said host time stamp in said time-correlating entry.

14. In the DP system set forth in claim 1 further including, in combination:

said time stamping means having a time out means for indicating a plurality of time out times;

limit means indicating a maximum time out time;

said peripheral subsystem DP means being said first one DP means;

said time stamping means being responsive to each said correlation request for a host time stamp to initiate said time out means to time out for a predetermined one of said time out times;

time compare means connected to said limit means and to said time out means for comparing said predetermined one of said time out times with said maximum time out time for indicating a response error whenever said predetermined one of said time out times has a longer duration than said maximum time out time; and said time stamping means having means connected to and responsive to said time compare means indicated response error to send up to a predetermined number of additional correlation requests for a host time stamp resulting in no received host time stamp within said maximum time out time and having request error means responsive to said time out means timing out after said maximum time out time said predetermined number of said additional correlation requests to enter in said data storage means an entry indicating failure of said predetermined number of correlation requests to obtain said host time stamp and time stamping the request error entry the time of said peripheral time clock.

15. In the DP system set forth in claim 14 further including, in combination:

a plurality of path groups in said data channel means;

said request error means selecting different predetermined ones of said path groups for sending predetermined ones of said predetermined number of additional correlation requests to said host processor DP means, respectively.

16. In the DP system set forth in claim 1, further including, in combination:

said host processor DP means including a first host identification of a predetermined one of said host processors with said host time stamp; and said time stamping means including said host identification in said time-correlating entry.

17. In the DP system set forth in claim 16, further including, in combination:

said host processor DP means sending a second host time stamp to said time stamping means via said data channel means and including a second host identification different from said first host identification with said second host time stamp; and said time stamping means receiving said second host time stamp and second host identification for generating a second time-correlating entry and recording the second time-correlating entry in said data storage means.

18. A method of operating a data processing (DP) system having host processor DP means and peripheral subsystem DP means, data channel means connecting the host processor DP means to the peripheral subsystem DP means for exchanging control information and data between said DP means, said host processor DP means having a time of day clock indicating a current time of day, data storage means in the peripheral subsystem DP means;

the method including steps of:

continuously generating a first peripheral time for indicating time in the peripheral subsystem DP means;

reading said current time of day indication from said time of day clock and sending said read current time of day indication to said peripheral subsystem DP means as a host time stamp;

upon receipt in said peripheral subsystem DP means of said host time stamp, reading said first peripheral time, making said first peripheral time a logging time stamp, then inserting said received host time stamp and said logging time stamp into a time-correlating entry and storing the time-correlating entry in said data storage means; and detecting and indicating a predetermined data processing event in the peripheral subsystem DP means, in response to said indicated predetermined data processing event, reading said first peripheral time for generating a second logging time stamp, generating an event log entry including said second logging time stamp and said indicated predetermined data processing event and storing the event log entry in said data storage means.

19. The method set forth in claim 18 further including steps of:

detecting and indicating an error event; and supplying said indicated error event as said predetermined data processing event to said data storage means.

20. The method set forth in claim 19 further including steps of:

transferring said entries, including said time-correlating entry, stored in said data storage means to said host processor DP means; and in said host processor DP means reading said event log entry and said time-correlating entry, then relating in time said predetermined data processing event with a host predetermined data processing event that occurred at time indicated by said second logging time stamp.

21. The method set forth in claim 18 further including steps of:

generating said first peripheral time indication at a first given periodicity;

generating a second peripheral time indication at a second given periodicity;

each time one of said time-correlating and event log entries is stored in said data storage means, storing a current time value of said first peripheral time indication as said logging time stamp; and in said peripheral subsystem DP means responding to a receipt of said host time stamp for storing a current time of said generated second peripheral time in said time-correlating entry as an event time stamp.

22. The method set forth in claim 21 further including steps of:

queuing said time-correlating entry before storing the time-correlating entry in said data storage means; and reading said second peripheral time as time of entry time stamp; and inserting into said time-correlating entry said entry time stamp, then storing the time-correlating entry in said data storage means.

23. In the method set forth in claim 22 further including steps of:

indicating a predetermined subsystem data processing event that occurred in said peripheral subsystem DP means; and responding to said indication of the predetermined subsystem data processing event to send a request message via said data channel means to said host processor DP means to send host time stamp to the peripheral subsystem DP means.

24. The method set forth in claim 23 further including steps of:

in said detecting and indicating step generating a second event log entry;

creating in said data storage means a LOG portion in which said time-correlating and event log entries are stored in a round-robin storage sequence, then storing said second event log entry in said LOG portion, and after storing said second event log entry in said log portion, indicating a LOG wrap status in said LOG portion, said LOG wrap status representing that a predetermined entry in said LOG portion has been overwritten by storing said second event log entry in said LOG portion; and in response to said indicated LOG wrap status, indicating said subsystem predetermined data processing event.

25. The method set forth in claim 23 further including steps of:

loading a predetermined microprogram into the peripheral subsystem DP means for microprogram initializing the peripheral subsystem DP means; and responding to loading said initial microprogram into the peripheral subsystem DP means to indicate said subsystem predetermined data processing event.

26. In the method set forth in claim 23 further including, the steps of:

in said peripheral subsystem DP means providing a cluster 0 and a cluster 1, separately connecting said data-storage cluster 0 and cluster 1 to said host processor DP means via said data channel means;

respectively providing first and second portions of said data storage means in said data-storage clusters 0 and 1;

separately performing said continuously generating step, said time of day clock step, said detecting and indicating step, said generating an event log entry step, said transferring step, said generating said first and second peripheral time indication steps, said queuing step, said reading said second peripheral time step, said inserting step, said indicating a predetermined subsystem data processing event step, and said responding step in each of said data-storage clusters 0 and 1 such that each said data-storage cluster 0 and 1 separately generate and store said time-correlating entry and said event log entries in said data storage means;

connecting a plurality of peripheral devices to said data-storage cluster 0 to said data-storage cluster 1 for providing a data transfer between said peripheral devices and said data channel means via either one of said data-storage clusters; and synchronizing said data-storage cluster 0 and said data-storage cluster 1 respective time-correlating entries for indicating a given time of day indication for both said data-storage clusters 0 and 1.

27. The method set forth in claim 26 further including steps of:

reading and sending as sent entries, to the host processor DP means, via said data channel means said time-correlating entry and said event log entries stored in said data-storage cluster 0 first portion of said data storage means; and time-correlating said sent entries for relating in time said cluster 0 predetermined data processing event with a host predetermined data processing event.

28. The method set forth in claim 27 further including steps of:

establishing a storage array in said data storage means as said LOG portion for storing said time-correlating and event log entries wherein said storage array is subject to overwriting and destroying predetermined ones of said entries including said time-correlating entry;

detecting and indicating an absence of said data-storage cluster 0 time-correlating entry in said sent entries;

responding to said indicated absence to read contents of said data-storage cluster 1 second portion of said data storage means including reading said time-correlating entry stored in said data-storage cluster 1 second portion of said data storage means; and then relating the time stamps in said data-storage cluster 1 time-correlating entry with the time stamps in said data-storage cluster 0 time-correlating entry for relating the cluster 0 logged event with said host predetermined data processing event.

29. The method set forth in claim 28, further including steps of:

establishing a time out for timing out in a predetermined time out time;

sending time-stamp requests for sending said host time stamp from said peripheral subsystem DP means to said host processor DP means;

responsive to sending each one of said time-stamp requests, initiating said established time out; and responsive to the time out timing out, sending another one of said time-stamp requests for said host time stamp up to a predetermined number of consecutive ones of said time-stamp requests.that result in no host time stamp being received by said peripheral subsystem DP means from said host processor DP means within said predetermined time out time for each one of said consecutive time-stamp requests; and responsive to said time out consecutively timing out said predetermined number of times, entering in said LOG portion a request error entry indicating failure of said time-stamp requests for said host time stamp and time stamping the request error entry the time of said first peripheral time.

30. The method set forth in claim 29 further including steps of:

establishing a plurality of path groups in said data channel means; and selecting a different one of said path groups for sending predetermined respective ones of said consecutive ones of said host time-stamp requests from said peripheral subsystem DP means to said host processor DP means.

31. The method set forth in claim 29 further including steps of:

before responding to predetermined ones of said time-stamp requests, queuing said host time stamp in a peripheral command queue in said host processor DP means;

measuring a time duration said host time stamp was queued in said host processor DP means;

establishing a queue time threshold for indicating a maximum permitted time duration for queuing said host time stamp;

if said measured time duration becomes greater than said maximum permitted time duration, at the expiration of said measured time duration, reading said current time of day indication from said time of day clock, then sending an update host time stamp to said peripheral subsystem DP means; and responsive to receipt of said update host time stamp, accessing said time-correlating entry to replace the host time stamp contained therein with said update host time stamp.

32. The method set forth in claim 31, further including steps of:

including a first host identification of a predetermined one of said host processor DP means with each said host time stamp sent to said peripheral subsystem DP means; and including said first host identification in said time-correlating entry.

33. The method set forth in claim 32, further including steps of:

sending a second host time stamp to said time stamping means via said data channel means and including a second host identification different from said first host identification with said second time stamp; and receiving said second host time stamp and second host identification in said peripheral subsystem DP means for generating a second time-correlating entry and recording the second time-correlating entry in said LOG portion of said data storage means.

34. In a peripheral subsystem, a data-storage cluster having storage path means, a data channel adaptor connected to the storage path means, a device adapter means connected to the storage path means such that the storage path means provides for data transfers between said data channel adaptor and said device adapter means, data storage means connected to the storage path means, support facility means connected to the data storage means and to the storage path means, the improvement, including, in combination:

first clock means in the support facility means for generating and indicating a first time in a first time granularity;

second clock means connected to the support facility means and to the storage path means for generating and indicating a second time in a second time granularity;

LOG means in the data storage means for storing a plurality of event and time-correlating entries;

time stamp means in the support facility means connected to the data channel adaptor for receiving a host time stamp from the channel adaptor, connected to the first and second clock means for receiving the first and second time indications and combining said host time stamp, said first time indication and said second time indication into a time-correlating entry and storing the time-correlating entry in said LOG means;

event recording means connected to said LOG means and to the first clock means and having event indicating means for indicating a predetermined event occurring in the peripheral subsystem, said event recording means combining said indicated event, said first time indication for generating an event log entry and for recording said event log entry in said LOG means; and data processing event means connected to event indicating means for sending an indication of a predetermined data processing event for recording in said LOG means, said event indicating means being responsive to receiving said indication of said predetermined data processing event to indicate said predetermined event.

35. In the peripheral subsystem set forth in claim 34, further including, in combination:

said data channel adaptor after sending said host time stamp to said support facility means, sending an update host time stamp to said support facility means; and said support facility means being responsive to receiving said update host time stamp for accessing said time-correlating entry from said LOG means for replacing said host time stamp with said update host time stamp.

36. In the peripheral subsystem set forth in claim 34, further including, in combination:

said support facility means having queue means for queuing said time-correlating entry for recording in said LOG means;

means in the support facility means for receiving said time-correlating entry from said queue means and being responsive to said receipt of said time-correlating entry to read from said second clock means a current time for generating an entered time stamp, then adding said entered time stamp to said time-correlating entry before recording the time-correlating entry into the LOG means.

37. In the peripheral subsystem set forth in claim 34, further including, in combination:

said data processing event means including initiation event means responsive to a given data processing event in the data-storage cluster for actuating the data channel means to supply said host time stamp to said time stamp means.

38. In the peripheral subsystem set forth in claim 37, further including, in combination:

initial program load means in the data-storage cluster for initializing the data-storage cluster and indicating said initializing as said given data processing event; and said initial program load means being connected to said initiation event means for indicating said given data processing event to the initiation event means.

39. In the peripheral subsystem set forth in claim 37, further including, in combination:
- LOG wrap means connected to the LOG means for detecting an indicating a LOG wrap status that results in overwriting entries in the LOG means; and
- said LOG wrap means being connected to the initiation event means for responding to said LOG wrap status to indicate said given data processing event to said initiation event means.

40. In the peripheral subsystem set forth in claim 34, further including, in combination:
- said first clock means having a clock synchronization terminal for connection to another cluster in the peripheral subsystem.

41. A method of operating a peripheral subsystem, said peripheral subsystem having a data-storage cluster having storage path means, a data channel adaptor connected to the storage path means, a device adapter means connected to the storage path means such that the storage path means provides for data transfers between the connected adapters, data storage means connected to the storage path means, support facility means connected to the data storage means and to the storage path means;

the method including steps of:
- generating and indicating, in said support facility means, a first time indication in a first time granularity;
- generating and indicating a second time indication in a second time granularity;
- establishing a LOG means in the data storage means;
- receiving from said data channel adaptor a host time stamp;
- receiving the first and second time indications and combining said first and second time indications with said host time stamp for creating a time-correlating entry, then storing the time-correlating entry in said LOG means;
- detecting and indicating a predetermined data processing event;
- recording in said LOG means said predetermined data processing event and said first time indication as a log entry.

42. The method set forth in claim 41, further including steps of:
- after sending said host time stamp to said support facility means, then sending an update host time stamp to said support facility means; and
- accessing said time-correlating entry in said LOG means, then replacing said host time stamp with said update host time stamp.

43. The method set forth in claim 41, further including steps of:
- queuing said time-correlating entry for recording in said LOG means for a predetermined time duration;
- responsive to expiration of said predetermined time duration, taking said second time indication for generating; and
- then, before recording the time-correlating entry into the LOG means, adding said entered time stamp to said time-correlating entry.

44. The method set forth in claim 41, further including steps of:
- detecting and indicating a given data processing event in the data-storage cluster; and
- responsive to said indicated given data processing event, actuating the data channel means to supply said host time stamp to said time stamp means.

45. The method set forth in claim 44, further including steps of:
- initializing the data-storage cluster and indicating said initializing as said given data processing event.

46. The method forth in claim 44, further including, the steps of:
- detecting an indicating a LOG wrap status in the LOG means that results in overwriting entries in the LOG means; and
- responsive to said LOG wrap status, indicating said given data processing event.

* * * * *

UNITED STATES PATENT AND TRADEMARK OFFICE
CERTIFICATE OF CORRECTION

PATENT NO. : 5,471,631
DATED : November 28, 1995
INVENTOR(S) : B. C. BEARDSLEY, et al.

It is certified that error appears in the above-indentified patent and that said Letters Patent is hereby corrected as shown below:

Column 18, line 32, change "said" (first occurrence) to --a--.

Signed and Sealed this

Twenty-third Day of April, 1996

Attest:

BRUCE LEHMAN

*Attesting Officer*   *Commissioner of Patents and Trademarks*